(12) United States Patent
Jordan

(10) Patent No.: US 6,934,301 B2
(45) Date of Patent: Aug. 23, 2005

(54) METHOD AND APPARATUS FOR CONVERTING DATA PACKETS BETWEEN A HIGHER BANDWIDTH NETWORK AND A LOWER BANDWIDTH NETWORK

(75) Inventor: Reuven D. Jordan, Ramat Ha Sharon (IL)

(73) Assignee: ECI Telecom Ltd., Petach-Tikva (IL)

(*) Notice: Subject to any disclaimer, the term of this patent is extended or adjusted under 35 U.S.C. 154(b) by 889 days.

(21) Appl. No.: 09/907,748

(22) Filed: Jul. 19, 2001

(65) Prior Publication Data
US 2003/0016690 A1 Jan. 23, 2003

(51) Int. Cl.[7] ............................ H04J 3/00; H04L 12/28
(52) U.S. Cl. ................... 370/466; 370/412; 370/477; 370/476; 709/232
(58) Field of Search ................... 370/539, 907, 370/338, 412, 476, 477, 468, 466; 709/230, 232

(56) References Cited

U.S. PATENT DOCUMENTS

| | | |
|---|---|---|
| 4,796,254 A | 1/1989 | van Baardwijk et al. |
| 5,020,058 A | 5/1991 | Holden et al. |
| 5,293,378 A | 3/1994 | Shimizu |
| 5,371,547 A | 12/1994 | Siracusa et al. |
| 5,570,356 A | 10/1996 | Finney et al. |
| 5,583,863 A | 12/1996 | Darr, Jr. et al. |
| 5,680,400 A | 10/1997 | York |
| 5,687,176 A | 11/1997 | Wisniewski et al. |
| 5,751,723 A | 5/1998 | Van den Heuvel et al. |
| 5,970,067 A | 10/1999 | Sathe et al. |
| 5,999,525 A | 12/1999 | Krishnaswamy |
| 6,002,692 A | 12/1999 | Wills |
| 6,014,708 A | 1/2000 | Klish |
| 6,081,523 A | 6/2000 | Merchant et al. |
| 6,088,369 A | 7/2000 | Dabecki et al. |
| 6,088,827 A | 7/2000 | Rao |
| 6,094,439 A | 7/2000 | Krishna et al. |
| 6,111,897 A | 8/2000 | Moon |
| 6,148,010 A | 11/2000 | Sutton et al. |
| 6,154,462 A | 11/2000 | Coden |
| 6,157,637 A | 12/2000 | Galand et al. |
| 6,618,383 B1 * | 9/2003 | Tomlins .................... 370/395.5 |
| 6,741,566 B1 * | 5/2004 | Furlong et al. ............. 370/236 |
| 2002/0107962 A1 * | 8/2002 | Richter et al. .............. 709/225 |
| 2003/0217215 A1 * | 11/2003 | Taborek et al. ............. 710/305 |

* cited by examiner

Primary Examiner—Duc Ho
(74) Attorney, Agent, or Firm—Nath & Associates, PLLC; Harold L. Novick (57) ABSTRACT

A method and apparatus for converting bursty, packetized data traffic from a wide bandwidth network to a constant, average rate traffic on a payload network having a narrower bandwidth is disclosed. The method includes converting a packet burst received from the wide bandwidth network to a serial stream having first and second pluralities of bytes, the second plurality of bytes having only idle bytes; substituting a place keeping flag for said second plurality of bytes thereby providing a reduced data; encapsulating the reduced data in a second packet; and providing the second packet to the narrower bandwidth network at a constant, average traffic rate. The method also includes converting the second packet received from the narrower bandwidth network to a second serial stream; substituting a plurality of idle bytes for the place keeping flags; converting the second serial stream and substituted idle bytes to a third packet; and providing the third packet to the wide bandwidth network.

36 Claims, 4 Drawing Sheets

METHOD AND APPARATUS FOR CONVERTING DATA PACKETS BETWEEN A HIGHER BANDWIDTH NETWORK AND A LOWER BANDWIDTH NETWORK

RELATED APPLICATION

This application is related to an application entitled Method and Apparatus for Converting Data Packets between a Higher Bandwidth Network and a Lower Bandwidth Network Having Multiple Channels by the same inventor and filed the same day as this application, said application being incorporated in its entirety herein by reference.

FIELD OF THE INVENTION

This invention relates, in general, to a method and apparatus for converting a data packet for transmission and reception in a communication network, and in particular to a method and apparatus for converting a data packet received from a first broadband telecommunications network to a second data packet configured for transmission on a payload network having a narrower bandwidth than the first broadband network; and, after transmission on the payload network, reconverting the second data packet back to a format of the first broadband network. In a particular embodiment, this invention relates to a method and apparatus for converting a data packet received from a 1 Gb Ethernet network to a format for transmission on an OCnc (n=1, 3, 12) payload network; and for re-converting the transmitted CCnc data packet back to a format of the 1 Gb Ethernet data packet.

BACKGROUND OF THE INVENTION

Ethernet is basically a broadcast protocol. Its main advantage is its simplicity. This allows Ethernet to be implemented with less costly hardware and software. Ethernet has become a common protocol for local area networks. For purposes of this application, the term "Ethernet" includes the entire class of Carrier Sense Multiole Access/Collision Detection (CSMA/CD) protocols covered by the family of computer industry standards known variously as IEEE-802.3 and ISO 8802/3. This includes but is not limited to 1-Mb Ethernet, known as "StarLAN", 10-Mb Ethernet, 100-Mb Ethernet, known as "Fast Ethernet", 1-Gb Ethernet and any future CSMA/CD protocols at any other data rates.

Ethernet, as with other network protocols, transmits data across a packet switched network. In packet switched networks data is divided into small pieces called packets that can be multiplexed onto high capacity inter-machine connections. Packet switching is used by virtually all computer interconnections because of its efficiency in data transmissions. Packet switched networks use bandwidth on a circuit as needed, allowing other transmissions to pass through the lines in the interim.

A packet is a block of data together with appropriate identification information necessary for routing and delivery to its destination. The packet includes a source address, a destination address, the data being transmitted, and a series of data integrity bits commonly referred to as a cyclical redundancy check or CRC. The source address identifies a device that originated the packet and the destination address identifies a device to which the packet is to be transmitted over the network.

As is known in the art transmission of a data packet on a packet switched network results in s transmission burst entails synchronously transmitting all bytes which make up the data packet. A data packet being transmitted on a 1 Gb Ethernet network has a u capacity of a certain maximum number of bytes corresponding to the network bandwidth capacity, but usually a fewer number of bytes are transmitted.

In simple point-to-point networks having only an origin node and a destination node, idle bytes can be inserted between packets. In more complex multi-node networks a link between nodes "i" and "j" is frequently left silent when there is nothing to be transmitted from node "i" to node "j"

An Ethernet packet size typically ranges from 40 to about 1500 bytes. A transmission rate of data communicated on the 1 Gb Ethernet network is typically less than about 600 Mbps; and is frequently not delay sensitive. Moreover, 1 Gb Ethernet packet transmissions are generally "bursty"— that is, they comprise a series of short, high density burst with idle bytes or silent periods dispersed between the burst.

A main drawback with conventional Ethernet is that there are significant limitations on the physical distance that the network can cover. Gigabyte Ethernet networks as with other forms of Ethernet are typically found in relatively short distance Local Area Networks (LANs) and Metropolitan Area Networks (MANs).

Long distance networks such as Wide Area Networks (WANs) frequently comprise Switched Optical Networks (SONETs) and frequently utilize conventional communications protocols such as OC12, OC3, or OC1, hereinafter collectively referred to as OCnc. In SONETs there is no particular packet size requirement.

Where it is desired to communicate the Ethernet data packet from the LAN or MAN in a first location across the long distance network to the LAN or MAN in a second location, it is necessary to convert the Ethernet packet to a format suitable for transmission across the long distance network. Encapsulation protocols have been developed to allow Ethernet packets to be transmitted over longer distances. In such protocols, the entire Ethernet packet is placed within another type of packet which has its own header and includes additional addressing information, protocol information, etc., and which conforms to a format of the long distance network. Thus, in encapsulation techniques the size of an encapsulating packet must be larger than a size of an encapsulated packet.

Currently known OC12 SONET/WAN systems have a bandwidth capacity of about 622 Mbps. On the other hand, 1 Gb Ethernet packets are, by definition, one gigabyte. Thus, in order to communicate a 1 Gb Ethernet packet on an OC12 network a technique other than simple data encapsulation is required.

The prior art includes many attempts to solve the problem of transmitting a large packet through an intervening smaller packet carrying network. This prior art includes the following U.S. patents:

U.S. Pat. Nos. 6,094,439 and 6,081,523 to Krishna et al., incorporated herein in their entirety by reference, disclose a Gigabit network node having a media access controller outputting packet data at Gigabit rates using multiple 100 MB/s physical layer links coupled to a physical interface having a data router to enable implementation of a Gigabit network using low cost data links. At least a portion of the packet data is selectively transmitted in a modified reconciliation layer onto the plurality of physical layer links.

U.S. Pat. No. 6,002,692 to Wills, incorporated herein in its entirety by reference, discloses an apparatus for interfacing a high speed broad bandwidth communication network to a communication fabric having a bandwidth which is a fraction of the high speed broad bandwidth network; and where the network and the fabric have different data packet formats. Data packets in a format of the high speed broad bandwidth network are converted to data packets in a format of the communications fabric and transmitted therethrough. At a terminal end of the fabric the data packets in the format of the fabric are re-converted back to the format of the high speed broad bandwidth network.

U.S. Pat. No. 5,751,723 to Vanden Heuvel et al., incorporated herein in its entirety by reference, discloses an apparatus and method for recovery of bandwidth overhead in a a packetized network wherein a secondary information is interleaved into vacant or idle bytes in a data packet having a primary information.

U.S. Pat. No. 5,687,176 to Wisniewski et al., incorporated herein in its entirety by reference, discloses an apparatus and method for zero-byte substitution in a channel unit or line card coupling a digital subscriber Lein to a digital transmission facility. An occurrence of an all-zero data byte causes a corresponding zero byte indicator flag to be produced, and also causes the all-zero byte to be replaced by the preceding non-zero data byte rather than by a prescribed or predetermined data byte. On the receive side, the occurrence of a repeated data byte is detected and causes the current data byte to be replaced by an all-zero byte to restore the original data.

U.S. Pat. No. 5,583,863 to Darr, Jr. et al., incorporated herein in its entirety by reference, discloses an arrangement for transporting digital broadband data output in Asynchronous Transfer Mode (ATM) cell streams from a plurality of video information service providers (VIPs) to a plurality of subscribers. A digital broadband network is adapted to receive a plurality of ATM streams from VIPs via optical fibers having a predetermined capacity. A plurality of receivers corresponding to the optical fibers output ATM cells from the optical fibers having active ATM cell streams to an ATM edge device having input ports corresponding to the Ln predetermined capacity of the optical fibers. The ATM edge device grooms the ATM cells by rejecting unauthorized cells and idle cells that do not carry information, and maps the remaining ATM cells to output ports having a lower predetermined capacity than the plurality of optical fibers coupled to the receivers. The mapped ATM cells are assigned translated VPI/VC: identifiers and are combined onto common signal paths for transport via optical fibers.

U.S. Pat. No. 5,371,547 to Siracusa et al., incorporated herein in its entirety by reference, discloses an apparatus for excising specific data from a data stream to reduce its transmission bandwidth; and for re-inserting the excised data to regenerate the original data stream.

U.S. Pat. No. 5,020,058 to Holden et al., incorporated herein in its entirety by reference, discloses a data communication system having a repetitive pattern packet suppression technique which suppresses transmission of entire packets in a data stream when a repeating pattern has been established in the previous packet and is then found to repeat throughout the following packets. The resulting hole in the data stream is filled at a destination end with the last pattern from the previously received packet.

Other U.S. patents of interest include: U.S. Pat. No. 6,157,637 to Galand et al.; U.S. Pat. No. 6,154,462 to Coden; U.S. Pat. No. 6,148,010 to Sutton et al.; U.S. Pat. No. 6,111,897 to Moon; U.S. Pat. No. 6,088,827 to Rao; U.S. Pat. No. 6,088,369 to Dabecki et al.; U.S. Pat. No. 6,014,708 to Klish; U.S. Pat. No. 5,999,525 to Krishnaswamy; U.S. Pat. No. 5,970,067 to Sathe et al.; U.S. Pat. No. 5,680,400 to York; U.S. Pat. No. 5,570,356 to Finney et al.; U.S. Pat. No. 5,293,378 to Shimizu; and U.S. Pat. No. 4,796,254 to van Baardwijk et al.; each of which is incorporated herein in its entirety by reference.

In spite of the numerous existing or published patents, there remains a need for a system that can reliably, economically and efficiently take a data packet for a larger bandwidth network and compress it to a size such that it can be transmitted on a narrower bandwidth.

SUMMARY OF THE INVENTION

Accordingly, one of the advantages of the present invention is that it can efficiently communicate a data packet for a larger bandwidth network across a smaller bandwidth network. In a particular embodiment it is therefore desirable to convert the data packet of the larger bandwidth network to the format of the smaller bandwidth network packet rather than simply encapsulate.

It is therefore an object of the present invention to provide an apparatus and method for converting a conventional data packet received from a first broadband network to a conventional data packet suitable for transmitting on a second broadband network, wherein a bandwidth of the second broadband network is less than a bandwidth of the first broadband network.

It is a further object of the present invention to provide the apparatus and method for converting the conventional data packet received from the first broadband network to the conventional data packet suitable for transmitting on the narrower bandwidth second broadband network, with no loss of data content.

It is a further object of the present invention to provide the apparatus and method for converting a conventional data packet received from a 1 Gb Ethernet network to a conventional data packet suitable for transmitting on a conventional standard bandwidth SONET such as an OCnc (n=1, 3, 12) payload network with no loss of data content.

A method accomplishing the foregoing objectives includes receiving a series of data packet bursts from a broadband network with idle bytes interposed between the bursts; removing the idle bytes to reduce a transmitted bit stream, framing the packets in accordance with a conventional protocol such as a General Frame Protocol (GFP) or Packet Over Sonet protocol (POS), and providing the framed data packets to said payload network.

It is an object of a specific embodiment of the present invention to provide the apparatus and method for converting the conventional series of bursty data packets received from a 1 Gb Ethernet network, to the conventional data packets suitable for retransmitting on an OC12 payload network. However, in order to successfully effectuate this conversion a large number of bytes (1 Gb minus 622 Mb) needs to be removed from the 1 Gb Ethernet data stream so that a size of the Ethernet valid payload can fit the OC12 bandwidth. Advantageously, a data content of the 1 Gb Ethernet stream is typically less than about 600 Mb, the remainder being idle bytes. Thus, removal of the idle bytes from the 1 Gb Ethernet stream can permit the Ethernet valid payload to fit the OC12 bandwidth without any loss of data content. In alternative specific embodiments the apparatus and method can be similarly adapted to an OC3 or an OC1 payload network. The apparatus and method of the present invention thus has general applicability to any OCnc (n=1, 3, 12) payload network.

Moreover, it is an object of the present invention to take advantage of the conventionally known bursty characteristic of Ethernet traffic, conventionally known to not be very delay sensitive, and to supply a SONET link with a bandwidth corresponding to an average valid data bandwidth of the Ethernet traffic, and therein to absorb the traffic bursts using a large buffer.

At a terminal end of the OC12 SONET/WAN the OC12 data packet can be restored to a format compatible with the 1 Gb Ethernet network.

These and other objects, features, and advantages of the invention will be better understood by those skilled in the art by reference to the following detailed description taken together with the following drawings in which like numerals identify like An components throughout the several views.

DETAILED DESCRIPTION OF THE PREFERRED EMBODIMENT

Figure 1:
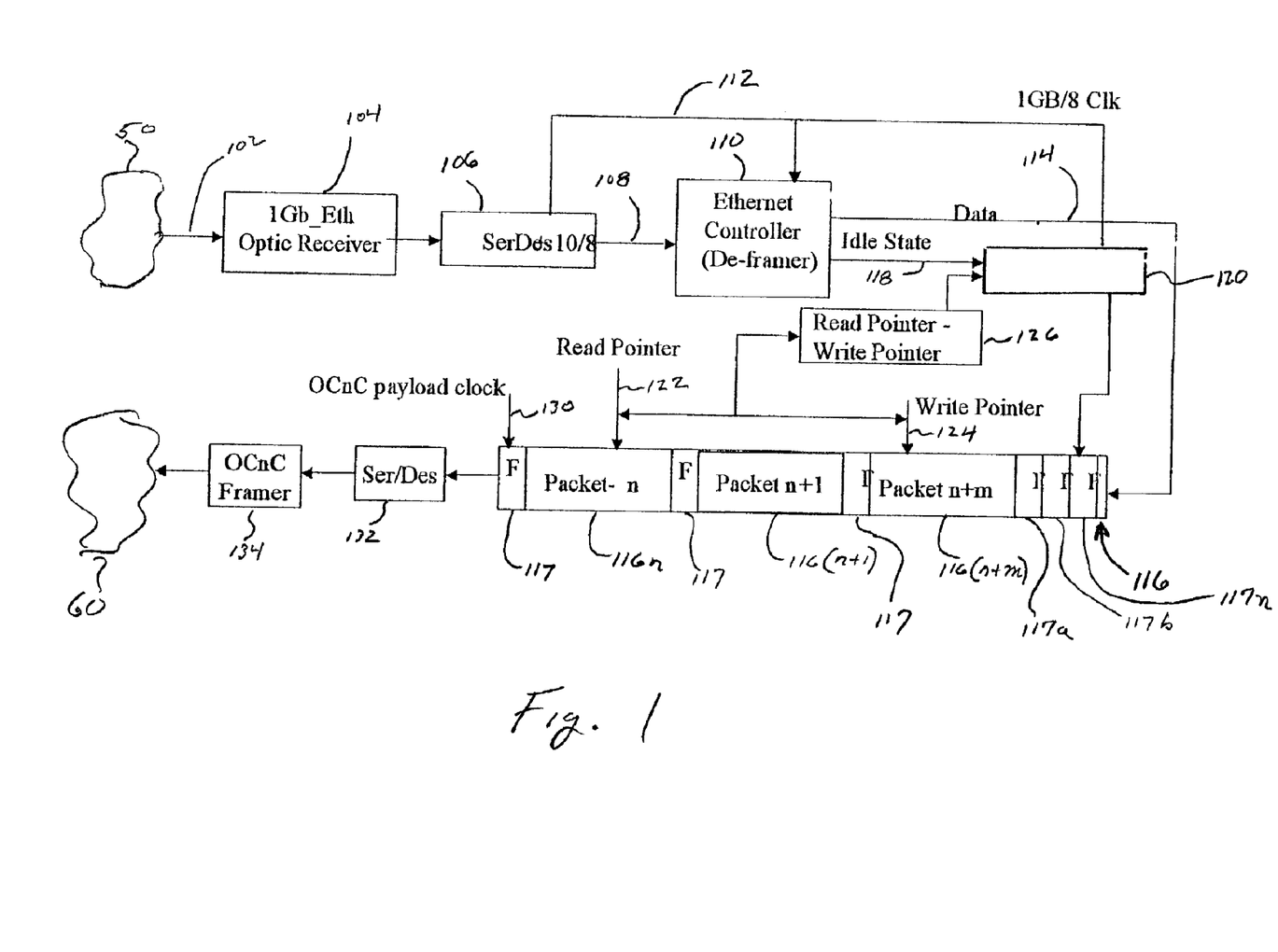
FIG. 1 is a schematic block diagram of an apparatus according to one embodiment of the present invention that can convert and format a 1 Gb Ethernet data packet for transmission on an OC12 payload network.

With reference to the figures in which like numerals represent like elements or components throughout the several views, and in particular with reference to FIG. 1, there is shown a schematic block diagram of an embodiment of an apparatus according to the present invention. The apparatus is for converting a bursty sequence of conventional 1 Gb Ethernet data packets (not shown) of a 1 Gb Ethernet network, schematically shown at 50, to a conventional OC12 data packet (not shown) of an OC12 payload network, schematically shown at 60.

Figure 3:
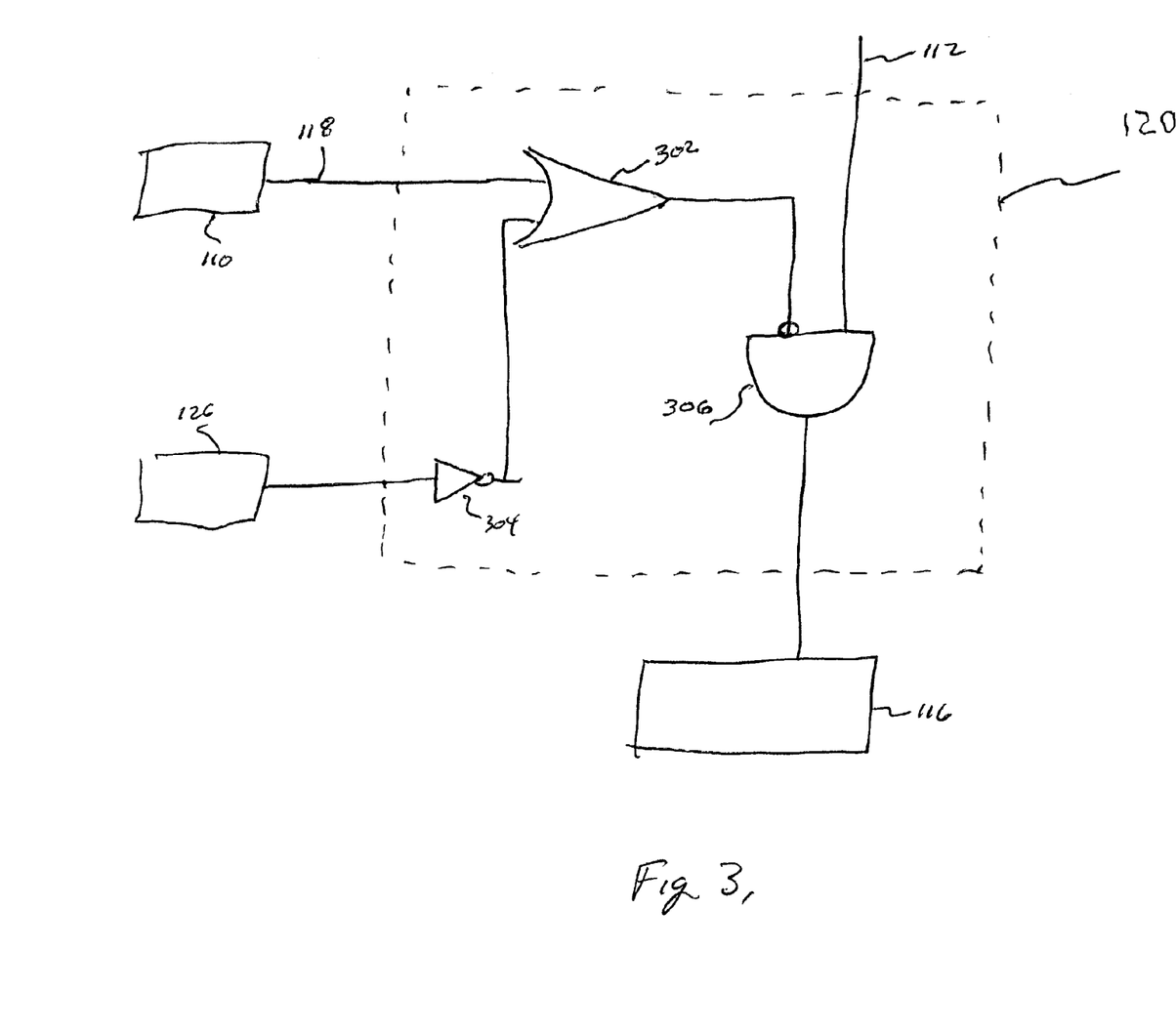
FIG. 3 is a schematic of a typical circuit of a control logic block of FIG. 1.

An Ethernet optical fiber 102 is connected at one end to Ethernet network 50. Another end of Ethernet optical fiber 102 is or connected to an input of a conventional 1 Gb Ethernet optical receiver 104. An output of optical receiver 104 is connected to an input of a conventional serializer-deserializer 106. A first output of serializer-deserializer 106 is connected by a link 108 to an input of a conventional Ethernet Controller or Deframer 110. A second output of serializer-deserializer 106 is connected to a link 112 which is connected to a second input of Ethernet Controller 110. An output of Ethernet Controller 110 is connected by a link 114 to a serial input port of an input buffer 116. A second output of Ethernet Controller 110 is connected by a link 118 to a control logic block 120. An example of a circuit of control logic block 120 is shown in FIG. 3.

Input Buffer 116 has a sequential arrangement of a plurality of buffer sections $116_n$, $116_{n+}$, $116_{n+m}$. Sections $116_n$, $116_{n+1}$, .. $116_{n+m}$ can be separated by a singular flag 117; or a plurality of flags such as $117_a$, $117_b$, . . . $117_n$. A read pointer 122 of section $116_n$ and a write pointer 124 of section $116_{n+m}$ are connected to an input of a conventional arithmetic difference a register 126. An output of register 126 is connected to a second input of control logic block 120. A third input of control logic block 120 is connected to link 112. An output of control logic block 120 is connected to input buffer 116 at an input end thereof. An OCnc payload clock signal 130 is connected to input buffer 116 at an output end thereof. An output of input buffer 116 is connected to an input of a conventional serializer-deserializer 132. An output of serializer-deserializer 132 is connected to an input of a conventional OCnc framer 134. An output of OCnc framer 134 is connected to OCnc payload network 60.

Serializer-deserializer 106 converts each byte in the Ethernet data packet to a corresponding serial data stream (not shown) in a conventional manner as is known in the art. U.S. Pat. No. 4,486,739 to Franaszek et al., incorporated herein in its entirety by reference, discloses a method and apparatus for converting a conventional 8-bit parallel data byte into 10 binary digits; and U.S. Pat. Nos. 3,334,181 to Bartlett et al. and U.S. Pat. No. 4,398,225 to Cornaby et al., Incorporated herein in their entirety by reference, disclose an apparatus and method for parallel to serial conversion; and serial to parallel conversion, respectively. Thus, the serial data stream comprises a sequential arrangement of data in a one-to-one correspondence with the bytes in the Ethernet data packet.

Serializer-deserializer 106 communicates the bytes in the serial data stream by link 108 to Ethernet Controller 110. Link 108 can be a conventional fiber optic cable, but can also be a Ad conventional wire connector. Serializer-deserializer 106 also provides a first clock signal to link 112 during a time duration of the serial data stream. The first clock signal corresponds to a timing of Ethernet network 50; and is strobed in synchronization as with the serial data stream outputted by serializer-deserializer 106. The first clock signal has a logical "high" value when a byte is transmitted in the serial data s-ream; and is strobed to a logical "low" value during an inter-byte time slice between successive bytes.

Ethernet Controller 110 sequentially receives each byte in the serial data stream from link 108 and outputs each received byte on serial data link 114 in a same order as received. Ethernet controller 110 uses a conventional protocol such as a GFP protocol or a POS protocol to maintain a packetized structure of the outputted serial data stream.

Ethernet Controller 110 receives the first clock signal from link 112. During each logical "high" value strobe of the first clock signal, Ethernet Controller 110 receives a "next in sequence" byte in the serial data stream from link 108 corresponding to a next byte in the Ethernet data packet. The "next in sequence" byte thus becoming a "current" byte. Ethernet Controller 110 determines if the "current" byte is a non-idle byte, i.e., that it is part of a serial data stream corresponding to a burst Ethernet data packet; or if the "current" byte is an idle byte, i.e., it is part of an inter-packet space between successive packet bursts. Ethernet Controller 110 outputs a binary valued logical idle state signal on link 118 based on this determination.

Register 126 is a conventional arithmetic difference unit which determines a difference in a numeric value of read pointer 122 and write pointer 124 located at different sections of input buffer 116. Read pointer 122 designates the location where the serial data stream corresponding to an "n"-th Ethernet data packet was previously serially stored in input buffer 116, and which is next in sequence to be serially written out from input buffer 116. Write pointer 124 designates the location in input buffer 116 where the serial data stream corresponding to an "n+m"-th Ethernet data packet is next to be written into input buffer 116.

Register 126 provides a binary valued logical output to control logic block 120 depending on an arithmetic difference between a value of read pointer 122 and a value of write pointer 124. If the arithmetic difference indicates that space exists in buffer 116 in which additional data can be written, register 126 outputs a first binary value to control logic block 120. If the arithmetic difference indicates that no space exists in buffer 116 in which additional data can be written, then a second binary value, different from the first binary value, is provided to control logic block 120.

Control logic block 120 combines the idle state signal on link 118 with the binary output from register 126 and provides a write enable output signal to input buffer 116.

Control logic block 120 follows the first clock signal on link 112 when the idle state signal indicates that the "current" byte on link 114 is not idle and the binary output from register 126 indicates that space exists in buffer 116 in which to write additional data. Control logic block therefore outputs a logical write-enable gate keeping signal to input buffer 116 that indicates that the "current" byte in the serial data stream provided from Ethernet Controller 110 on serial data link 114 is to be serially written into input buffer 116. During the inter-byte time slice between bytes in the serial data stream when the first clock signal is at a logical "low" value, control logic block 120 provides a write-disable gate keeping signal that indicates to input buffer 116 that no data is currently to be written.

When the idle state signal indicates that the "current" byte is idle, the write-enable gate keeping signal from control logic block 120 will not be provided to input buffer 116 and the "current" byte will therefore not be written into buffer 116. Similarly, if register 126 indicates that no space exists in buffer 116 in which to write additional data, the write-enable gate keeping signal from control logic block 120 will again not be provided to input buffer 116. Thus, the "current" byte will similarly not be written into buffer 116. Buffer 116 inserts a flag 117 as a place keeper for idle bytes in the serial data stream provided by link 114 corresponding to idle bytes between successive burst Ethernet data packets which are not written into buffer 116.

A signal from OCnc payload clock 130 is provided to an output section of buffer 116. Payload clock 130 provides a clock signal synchronized with OCnc payload network 60. Payload clock 130 triggers buffer 116 to output a serial data stream (not shown), corresponding to the stored serial data stream, to an input of serializer-deserializer 132. Since the gate keeping signal provided by control logic block 120 corresponds to the 1 Gb clock rate of the Ethernet network and is therefore faster than the signal provided by OCnc payload clock 130, the rate at which data is written to buffer 116 can be faster than the rate at which data is read from buffer 116. Thus, and in order to prevent a buffer overflow, the values of read pointer 122 and write pointer 124 are provided to register 126 to regulate enabling the gate keeping signal of control logic block 120. A conventional pulse command (not shown) can also be returned to the Ethernet network instruction it to stop sending data. Thus, buffer 116 absorbs the differential between the write rate from the Ethernet network 50 and the read rate to the OCnc payload network 60.

Serializer-deserializer 132 is a conventional circuit and receives the serial data stream read from buffer 116, comprising the valid data content of the data packets and place keeping flags 117, and reconverts each byte in the outputted serial data stream, together with the place keeping flags, to a parallel data (not shown) in a conventional manner as is known in the art. Thus, the parallel data comprises a plurality of bytes and place keeping flags arranged in a one-to-one correspondence with the sequence of bytes in the serial data stream outputted from Ethernet Controller 110 and the omitted inter-packet idle bytes.

Serializer-deserializer 132 outputs the parallel data to an input of OCnc framer 134. OCnc framer 134 frames the parallel data in accordance with a selected protocol of OCnc payload network 60, such as by adding applicable header and routing information, thereby providing the conventional data packet (not shown) for the OCnc payload network. OCnc Framer 134 outputs the CCnc data packet to OCnc payload network 60 to be transmitted.

Encapsulation of the valid Ethernet payload for transmission on the SONET link can also be performed using protocols such as GFP and POS and can be controlled by control logic block 120.

Figure 2:
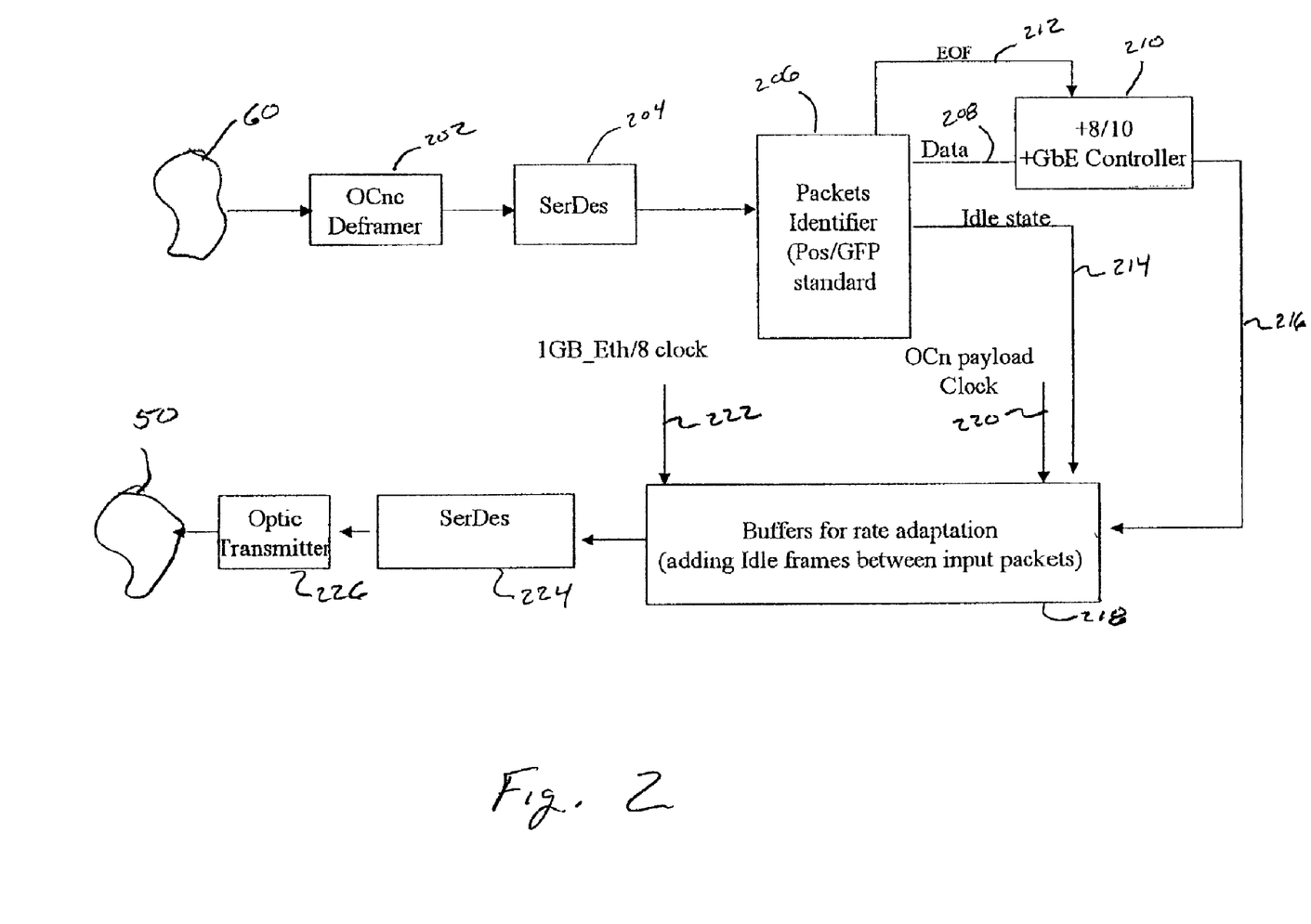
FIG. 2 is a schematic block diagram of an apparatus according to a specific embodiment of the present invention that can reconvert and reformat the data packet transmitted on the OC12 payload of FIG. 1 to a 1 Gb Ethernet packet.

Referring now to FIG. 2, there is shown a schematic block diagram of an embodiment of an apparatus for converting the data packet of the OCnc payload network of FIG. 1 back to the format of the data packet for the 1 Gb Ethernet network according to the present invention.

OCnc payload network 60 is connected to an input of a conventional OCnc deframer 202. An output of deframer 202 is connected to an input of conventional serializer-deserializer 204, whose output in turn is connected to an input of a conventional packets identifier 206.

A serial data output of packets identifier 206 is connected by a serial data link 208 to a Gb Ethernet Controller 210. A second output of packets identifier 206 is connected by a link 212 to Ethernet Controller 210. A third output of packets identifier 206 is connected to a link 214.

An output of Gb Ethernet Controller 210 is connected by a link 216 to an Input of buffer 218. Link 218, from packets identifier 206, is also connected to the input end of buffer 218. An OCnc payload clock 220 is connected to the input end of buffer 218; and a 1 Gb Ethernet clock 222 is connected to the output end of buffer 218.

An output from buffer 218 is connected to an input of serializer-deserializer 224, an output of which is connected to an input of optical transmitter 226. An output of optical transmitter 226 is connected to 1 Gb Ethernet network 50.

The OCnc data packet (not shown) is received by deframer 202 from OCnc payload network 60. Deframer 292 removes any header and routing information which had been added by framer 134, shown in FIG. 1, and thereby provides parallel data which replicates the parallel data outputted from serializer-deserializer 132 also shown in FIG. 1. OCnc deframer 202 outputs the parallel data to serializer-deserializer 204.

Serializer-deserializer 204 converts the parallel data in the OCnc packet to a corresponding serial data stream (not shown) in a conventional manner as is known in the art. Thus, the serial data stream comprises a plurality of bytes and place keeping flags arranged sequentially in a one-to-one correspondence with the bytes and place keeping flags in the parallel data.

Serializer-deserializer 204 provides the serial data stream to packets identifier 206. Packets identifier 206 sequentially receives each byte and place keeping flag in the serial data stream from serializer-deserializer 204 and outputs each received byte and place keeping flag onto serial data link 208 in a same order as received. Packets identifier 206 using a conventional protocol as is known in the art such as a GFP protocol or a POS protocol, also outputs a binary valued logical end-of-packet signal onto link 212. The outputted signal has a value which represents the condition of whether or not a last byte in the converted OCnc packet has been outputted on serial data link 208. In a preferred embodiment, the end-of-packet signal has a logical "low" value while packets identifier 206 is outputting bytes to serial data link 208; and a logical "high" value after the last byte in the serial data stream is outputted.

Bytes in the serial data stream outputted from packets identifier 206 onto serial data link 208 are outputted by Gb Ethernet Controller 210 and communicated by link to buffer 218 where they are written into the buffer in synchronization with the OCnc clock signal from payload clock 220. After the last byte in the serial data stream is provided by packets identifier 206, the logical value of the end-of-packet signal on link 212 switches from a logical "low" value to a logical "high" value. Concurrently therewith, the signal on link 214 also switches to a logical "high" value indicating an idle state between packets and that no further data is to be currently written into buffer 218.

Data contents of buffer 218 are serially outputted to serializer-deserializer 224 in synchronization with the signal from 1 Gb Ethernet clock 222.

Serializer-deserializer 224 receives the serial data stream from buffer 218, converts the outputted serial data stream to a parallel data packet formatted for 1 Gb Ethernet network 50, and outputs the parallel data packet to optical transmitter 226 which transmits the Ethernet data packet to Ethernet network 50.

Referring now to FIG. 3, an example of a logic circuit of control logic block 120 is shown.

Figure 4:
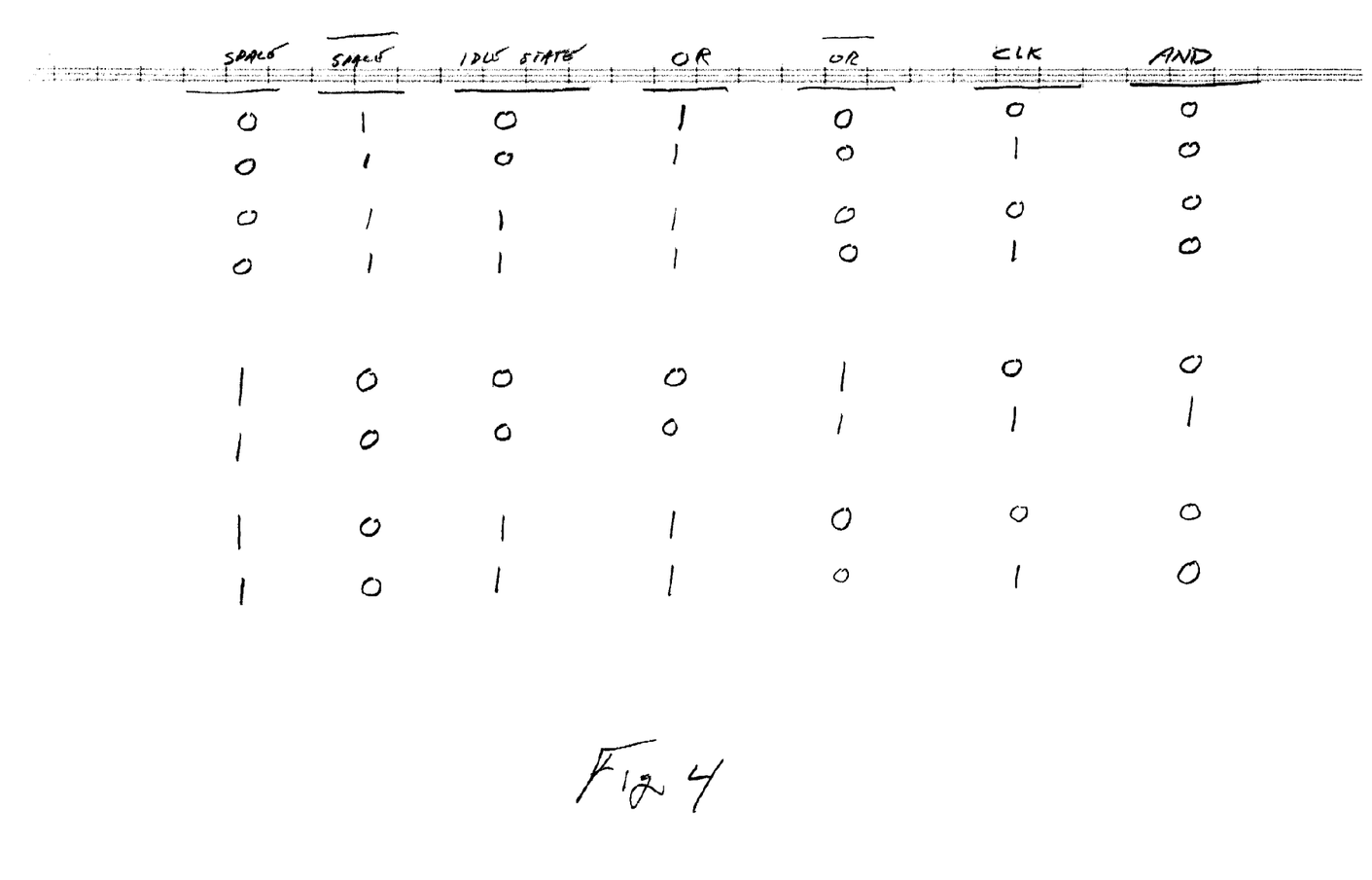
FIG. 4 is a truth table of the operation the control logic block circuit of FIG. 3

The output of Ethernet Controller 110 is connected by link 118 to the first input of control logic block 120 which in FIG. 3 is a first input of OR gate 302. The output of arithmetic difference register 126 is connected to the second input of control logic block 120 which in FIG. 3 is an input to inverter 304. The first clock signal on link 112 is connected to the 3rd input of control logic block 120 which in FIG. 3 is an input to AND gate 306. AN output from inverter 304 is connected to a second input of OR gate 302. An output from OR gate 302 is connected to an inverted second input of AND gate 306. A truth table of the operation of control logic block 120 is shown in FIG. 4.

Ethernet Controller 110 outputs a logical "high" signal to OR gate 302 during an idle state between packets and a logical "low" value at other times. Arithmetic difference register 126 outputs a logical "high" value to inverter 304 when space is available to receive data in input buffer 116 and a logical "low" value at other times. Inverter 304 inverts the signal from register 126 and provides the inverted signal to the second input of OR gate 302.

OR gate 302 ORs the signal from Ethernet Controller 110 and the inverted signal from register 126 and provides the result to the inverted input of AND gate 306.

When the space available signal from register 126 is "low" (no space), inverter 304 outputs a "high" signal to OR gate 302. Thus, irrespective of the idle state signal from Ethernet Controller 110, OR gate 302 output a "high" signal which is provided to the inverted input of AND gate 306. AND gate 306 outputs a logical "low" value (write disable) disabling writing to buffer 116.

When the space available sign from register 126 is "high" (space available), inverter 304 outputs a "low" signal to OR gate 302. If the idle state signal from Ethernet Controller 110 is "high" (idle state) OR gate 302 outputs a "high" signal which is provided to the inverted input of AND gate 306 which then outputs a logical "low" value (write disable) disabling writing to buffer 116. If the idle state signal from Ethernet Controller 110 is "low" (not idle state) OR gate 302 outputs a "low" signal which is provided to the inverted input of AND gate 306 which ANDs the signal with the 1 Gb clock signal on link 112. Thus, AND gate 306 provides a write-enable signal to buffer 116 in synchronization with the 1 Gb clock signal on link 112 thereby enabling writing to buffer 116.

As is obvious to those skilled in the art other equivalent logical circuits for control logic block 120 can be constructed that similarly provide write enable signals to buffer 116 in response to the first clock signal, the idle signal and the space The present invention has now been described with respect to a selected embodiment thereof. However, other embodiments would be obvious to those skilled in the art without departing from the spirit and scope of the appended claims.

I claim:

1. A method for converting a data stream having a plurality of data packets that has non-idle bytes therein and having idle bytes interposed therebetween received from a broadband network that is at least a 1 Gb Ethernet network for communication on a SONET payload network having a narrower bandwidth than said broadband network, comprising:

receiving a plurality of data packets, including a first data packet from the broadband network;

detecting idle bytes following said first data packet;

writing said non-idle bytes into a buffer and omitting said idle bytes;

outputting said non-idle bytes from said buffer;

converting said outputted non-idle bytes into a second data packet, thereby providing a reduced data stream; and providing said reduced data stream to said payload network.

2. The method as claimed in claim 1 wherein said SONET network is selected from the group consisting of (OC1, OC3, and OC12).

3. The method as claimed in claim 1 wherein said first data packet is formatted in accordance with a protocol of said broadband network.

4. The method as claimed in claim 1 further comprising writing a place keeping flag into said buffer in substitution of an omitted idle byte.

5. The method of claim 4 further comprising a GFP or POS protocol.

6. The method of claim 4 further comprising outputting said place keeping flag from said buffer.

7. The method of claim 6 wherein said second-data packet further comprises said place keeping flag.

8. The method as claimed in claim 1 wherein said step of detecting said idle bytes is in response to a first clock signal, said first clock signal corresponding to a timing of said first data packet.

9. The method as claimed in claim 1 wherein said step of writing said non-idle bytes into said buffer is in response to a first clock signal, said first clock signal corresponding to a timing of said first data packet.

10. The method as claimed in claim 1 wherein said step of converting said outputted non-idle bytes to said second data packet is in response to a payload network clock signal.

11. The method as claimed in claim 1 further comprising deserializing said non-idle bytes outputted from said buffer.

12. The method as claimed in claim 1 further comprising formatting said second data packet in accordance with a protocol of said payload network.

13. A method for converting data packets received from a narrow bandwidth SONET payload network for communication on a broadband network having a bandwidth that is at least 1 Gb Ethernet network and that is wider than said payload network, comprising:

receiving a data packet having a data from said payload network;

identifying a first data segment which comprises non-idle bytes in said received data packet;

identifying a place keeping flag in said received data packet;

appending a second data-segment comprising idle bytes to said data thereby providing an enhanced-data; and providing said enhanced data to said broadband network.

14. The method as claimed in claim 13 wherein said SONET network is selected from the group consisting of OC1, OC3, and OC12.

15. The method as claimed in claim 13 wherein said received data packet is formatted in accordance with a protocol of said payload network.

16. The method of claim 15 wherein said protocol is a GFP protocol or a POS protocol.

17. The method as claim 13 wherein said step of identifying a first data segment is in response to a payload clock signal corresponding to a timing of said payload network.

18. The method as claimed in claim 13 further comprising writing said first data segment to a first buffer.

19. The method as claimed in claim 18 wherein said step of writing said first data segment to a buffer is in response to a payload clock signal corresponding to a timing of said payload network.

20. The method as claimed in claim 18 wherein said step of outputting said first data segment from said buffer is in response to a broadband clock signal.

21. The method as claimed in claim 13 further comprising converting said enhanced data to a corresponding second data packet; and formatting said second data packet in accordance with a protocol of said broadband network.

22. A method for converting a first data packet from a format of a first broadband network to a second data packet having a format of a payload network for transmission thereon and thereafter converting said second data packet back to a third data packet having the format of the first broadband network, comprising:

converting said first data packet to a first serial data stream;

identifying idle bytes and non-idle bytes in said first serial data stream;

sequentially writing said non-idle bytes into a buffer;

inserting a place keeping flag into said buffer at a location corresponding to a location of an idle byte next following said non-idle byte;

serially outputting a contents of said buffer;

converting said outputted contents to a second data packet;

converting said second data packet to a second serial data stream;

writing said second serial data stream to a buffer;

identifying said place keeping flag in said second serial data stream;

replacing said place keeping flag with substitute idle bytes.

23. A communication system for converting data packets between a broadband network that is at least 1 Gb Ethernet network and a narrower bandwidth SONET payload network, comprising:

a first data having idle bytes and non-idle bytes;

an idle bytes identifier in communication with said first data;

a buffer connected to said idle bytes identifier;

a logic circuit connected to said idle bytes identifier and said buffer that can enable and disable writing of said first data into said buffer in response to a signal from said idle bytes identifier.

24. The communications system as claimed in claim 23 wherein said SONET network is selected from the group consisting of OC1, OC3 and OC12.

25. The communications system as claimed in claim 23 further comprising a first converter that can convert a data packet in a format of said broadband network to said first data.

26. The communications system as claimed in claim 23 wherein said buffer further comprises:

a read pointer and a write pointer;

wherein said logic circuit is further controlled by said read pointer and said write pointer.

27. The communications system as claimed in claim 23 wherein said first data can be written into said buffer at a rate corresponding to a clock rate of said broadband network.

28. The communications system as claimed in claim 23, further comprising a place keeping flag in said buffer in substitution of said idle bytes when said logic gate disables writing of said first data.

29. The communications system as claimed in claim 28 wherein said non-idle bytes and said place keeping flags can be read from said buffer at a rate corresponding to a clock rate of said payload network.

30. The communications system as claimed in claim 28 further comprising a second converter that can convert said non-idle bytes and said place keeping flags from said buffer to a data packet in a format for said payload network.

31. A communication system for converting data packets between a SONET payload network to a broadband network that is at least 1 Gb Ethernet network having a wider bandwidth than said payload network, comprising:

a first data having non-idle bytes and place keeping flags;

a buffer into which said first data can be written at a rate corresponding to a clock rate of said payload network;

wherein said place keeping flags are replaced with substitute idle bytes.

32. The communication system as claimed in claim 31 wherein said SONET network is selected from the group consisting of: OC1, OC3, and OC12.

33. The communications system as claimed in claim 31, further comprising a first converter that can convert a data packet in a format of said payload network to said first data.

34. The communications system as claimed in claim 31, further comprising a second converter that can convert an output of said buffer to a data packet in a format of said broadband network.

35. The communications system as claimed in claim 31, wherein said buffer can receive said first data at a rate corresponding to a clock rate of said broadband network.

36. A communications system for converting a first data packet from a format of a first broadband network to a second data packet having a format of a payload network for transmission thereon and thereafter converting said second data packet to a third data packet having the format of the first broadband network, comprising:

a first converter that can convert said first data packet to a first serial data stream;

an identifier that can identify idle bytes and non-idle bytes in said first serial data stream, said identifier connected to an output of said converter;

a buffer having an input and an output, said buffer input connected to an output of said identifier, whereby said non-idle bytes can be written into said buffer, a writing operation to said input of buffer being controlled by a logic circuit controlled by said identifier;

a place keeping flag stored in said buffer at a location corresponding to a location of an idle byte in said first serial data stream;

an output of said buffer connected to a second converter that can convert a contents of said buffer comprising said non-idle bytes and said place keeping flag to said second data packet;

a third converter that can convert said second data packet to a second serial data stream;

a second buffer connected to said third converter that can receive said second serial data stream, said second buffer having substitute idle bytes stored therein in substitution of said place keeping flags;

a fourth converter connected to an output of said buffer that can convert an output from said buffer comprising said non-idle bytes and said substitute idle bytes to said third data packet.

* * * * *